United States Patent
Heim

(10) Patent No.: US 8,208,264 B2
(45) Date of Patent: Jun. 26, 2012

(54) CONTROL DEVICE HAVING A POSITION SENSOR

(75) Inventor: Michael Heim, Holzgerlingen (DE)

(73) Assignee: Robert Bosch GmbH, Stuttgart (DE)

(*) Notice: Subject to any disclaimer, the term of this patent is extended or adjusted under 35 U.S.C. 154(b) by 210 days.

(21) Appl. No.: 12/599,024

(22) PCT Filed: Jun. 12, 2008

(86) PCT No.: PCT/EP2008/057352
§ 371 (c)(1),
(2), (4) Date: Nov. 5, 2009

(87) PCT Pub. No.: WO2009/003814
PCT Pub. Date: Jan. 8, 2009

(65) Prior Publication Data
US 2010/0134997 A1 Jun. 3, 2010

(30) Foreign Application Priority Data
Jun. 30, 2007 (DE) .......................... 10 2007 032 139

(51) Int. Cl.
*H05K 5/06* (2006.01)
(52) U.S. Cl. .................... 361/752; 174/520; 324/207.25
(58) Field of Classification Search .................. 361/752, 361/730, 728; 174/520, 521, 50.5, 50.52, 174/50.54; 324/207.25
See application file for complete search history.

(56) References Cited

U.S. PATENT DOCUMENTS

| | | | |
|---|---|---|---|
| 5,671,122 A * | 9/1997 | Schoettl et al. | 361/715 |
| 6,021,368 A | 2/2000 | Taniguchi et al. | |
| 6,140,898 A | 10/2000 | Satoh et al. | |
| 6,341,066 B1 * | 1/2002 | Murowaki et al. | 361/707 |
| 7,059,214 B2 * | 6/2006 | Murakami et al. | 74/606 R |
| 7,178,419 B2 | 2/2007 | Murakami et al. | |
| 7,208,943 B2 * | 4/2007 | Godoy et al. | 324/207.25 |
| 7,263,905 B2 * | 9/2007 | Seffernick et al. | 73/862.333 |
| 2004/0174159 A1 * | 9/2004 | Ramirez | 324/207.13 |
| 2007/0109730 A1 * | 5/2007 | Shigyo et al. | 361/600 |

FOREIGN PATENT DOCUMENTS

| | | |
|---|---|---|
| EP | 0844418 | 5/1998 |
| EP | 0984208 | 3/2000 |
| EP | 1193423 | 4/2002 |
| EP | 1489339 | 12/2004 |
| JP | 63-117504 | 5/1988 |
| JP | 5-4427 | 1/1993 |
| JP | 10-151954 | 6/1998 |
| JP | 11-148840 | 6/1999 |
| WO | WO 2006/115162 | 11/2006 |
| WO | WO 2006/129811 | 12/2006 |

OTHER PUBLICATIONS

International Search Report, PCT International Patent Application No. PCT/EP2008/057352, dated Sep. 10, 2008.

* cited by examiner

*Primary Examiner* — Dameon Levi
(74) *Attorney, Agent, or Firm* — Kenyon & Kenyon LLP

(57) ABSTRACT

An electronic control device is described for controlling an automatic transmission, having a control circuit an integrated plug connector and an integrated position sensor in a housing, the position sensor including a stator and a rotor. In order to improve the production quality of the position sensor, the stator of the position sensor is enclosed by the material of the housing in a stationary manner.

9 Claims, 3 Drawing Sheets

CONTROL DEVICE HAVING A POSITION SENSOR

FIELD OF THE INVENTION

The present invention relates to an electronic control device for controlling an automatic transmission, having a control circuit, an integrated plug contact and an integrated position sensor in a housing, the position sensor including a stator and a rotor. The present invention relates to a method for producing a control device.

BACKGROUND INFORMATION

A control circuit controls a transmission based on data of engine parameters, such as the engine speed and a position sensor that records the gear selection desired by the driver. Thus, the position sensor detects a gear, selected by the driver using a gear lever, for the transmission based on a setting of a rotor with respect to a stator of the position sensor.

European Patent No. EP 1 489 339 A1 describes a control device for an automatic transmission having a contact-free Hall position sensor, a ceramic control board and a two-shell housing that includes a housing base plate and a housing cover. The control board is adhered to the housing base plate using heat-dissipating adhesive connections. A connection board is screwed onto the base plate for grounding. Electrical adhesive connections contact the connection board to terminals of the Hall position sensor and to terminals of the control board. The connection board is used only for electric current connection, and has no electronic circuit elements. According to one special specific embodiment, the control board is screwed onto the housing base plate.

SUMMARY

It is an object of the present invention to create a control device and a production method of the type mentioned at the outset, which make possible the production of control devices having a higher quality of position sensor.

According to the present invention, the stator of the position sensor is enclosed in a stationary manner by material of the housing. This has the advantage that assembly tolerances are reduced, compared to adhering a stator into a housing. This may be important since the assembly tolerances have a direct effect on the system tolerances of the position sensor. The reduction in the assembly tolerances thus leads to a reduction in the system tolerances, so that the tolerance width, that is to be set, of the electrical signals of the position sensor, decreases and the production quality of large runs improves. Setting the position sensor is clearly able to take place faster, since the tolerance width of the electrical signals of the position sensor is clearly smaller. The rotor may be positioned to be able to move in a rotatory fashion about the stator of the position sensor. Of course, specific embodiments are also possible in which the rotor is able to move in a translatory contact-free manner with respect to the stator.

The stator advantageously includes two coils which cooperate with a coil on the rotor, according to an inductive method. An inductively operating position sensor has the advantage over the usual position sensors that it works very precisely, having a high resolution and a high reliability.

According to one preferred specific embodiment, the stator includes a sensor printed-circuit board whose edge regions are enclosed in a stationary manner by crosspieces of the housing. A sensor printed-circuit board has the advantage that it is able to be easily enclosed by the housing material, because of the corners. The sensor printed-circuit board is for integrating an evaluation circuit for the inductive coils, the coils being also situated on the sensor printed-circuit board. The evaluation circuit of the position sensor preprocesses the detected signals and passes them on to the control circuit as inducement of control commands for the transmission. According to the present invention, only the edge regions, the inner and outer edges or rims of the sensor printed-circuit board are enveloped, enclosed by the material of the housing. This avoids additional tolerances in the x and y direction by an offset of the sensor printed-circuit board, relative to the housing, which occurs in the usual adhering in place, as well as a variation in the z direction, which would be created by a differently high adhesive layer thickness. The inductive coils are thus located at high reproducibility, and therefore at great production quality, in the same position with respect to a coil of the position sensor situated on the rotor.

According to one particular specific embodiment, the edge regions of the sensor printed-circuit board of the position sensor are enclosed using clip crosspieces. The clip crosspieces may be barbed-shaped crosspieces protruding outwards, which easily yield outwards until the sensor printed-circuit board interlocks with the clip crosspieces. Another specific embodiment of clip crosspieces is designed so that they engage with the sensor printed-circuit board with form-locking, like a groove-and-tongue joint and the clip function is first brought to bear between a clip crosspiece and housing when the clip crosspieces are fastened to the housing. This has the advantage that the sensor printed-circuit board is not stressed by pressure, and thus a possible fracture in the sensor printed-circuit board may be avoided.

In order to minimize the production costs and the number of components, as well as the number of production steps, the sensor printed-circuit board of the position sensor may be advantageously molded into the housing. This has the advantage that the assembly step of introducing the sensor printed-circuit board into the housing is eliminated, and the sensor printed-circuit board is situated in the housing in a precise position.

In order for the position sensor having the rotatable rotor to be installed in the housing in a loss-proof manner, the housing is constructed in several parts, particularly in three parts, so that the rotor is enclosed by the housing. The housing preferably includes a base plate, an intermediate housing part and a cover. A plug connection pointing outwards is formed on the intermediate housing part. A data input and output to the control circuit takes place over the plug connection, as well as the current supply.

The sensor printed-circuit board is molded into the intermediate housing part, according to an example embodiment of the present invention. The edge regions of the sensor printed-circuit board, in this context, are enclosed on their outer circumference by crosspieces made of the material of the intermediate housing part. The edge region of a circular cutout, for the passage of a selector lever shaft, is enclosed by an annular crosspiece formed by the intermediate housing part.

The intermediate housing part and the cover are preferably made of plastic, and the base plate of aluminum. The base plate is made of aluminum, so as to dissipate the heat loss created by the operation of the control circuit. Plastic is an economical material for the intermediate housing part and the cover, and it permits complex shaping and is easily deformable in an injection molding process. Besides that, plastic is a preferred material for light-weight design in motor vehicle construction.

In order to simplify the electrical connections between the sensor printed-circuit board and the control circuit, the crosspieces framing the rim of the sensor printed-circuit board are interrupted in the area of electrical bonding connections. The bonding connections, so-called bonds, in brief, may thus be shifted on the same level and in a material-saving manner, between the sensor printed-circuit board and the control circuit.

An object of the method according to the present invention, for producing a control device defined by the abovementioned features, may be attained in that the stator of a position sensor is injection molded into a housing. Compared to a stator that has to be adhered into the housing, the method according to the present invention has the advantage that an offset in the x, y and/or z direction occurs clearly in a lesser manner, and consequently, system tolerances of the position sensor, which come about from the relation between rotor and stator, are clearly reduced at a high reproduction precision. Thus, the adjustability or the speed of the adjustment of a position sensor improves considerably.

It is understood that the aforementioned features, which will be discussed below, are able to be used not only in the individually indicated combination but also in other combinations.

The present invention is explained below on the basis of an exemplary embodiment, with reference to the figures.

DETAILED DESCRIPTION OF EXAMPLE EMBODIMENTS

Figure 1:
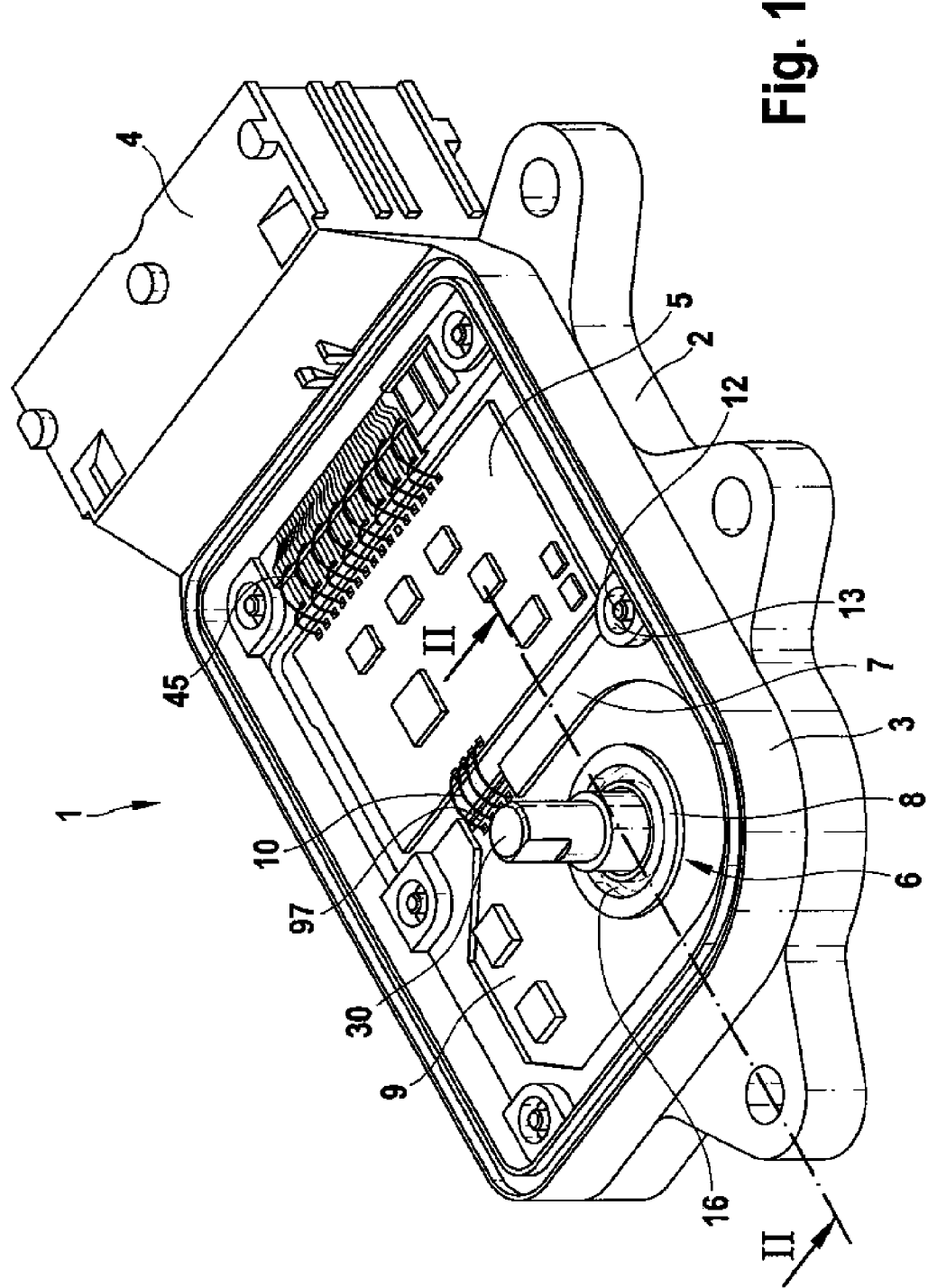
FIG. 1 shows a perspective view of a control device without cover.

In a perspective view, FIG. 1 shows an example control device 1 according to the present invention, having a base plate 2 made of aluminum. An intermediate housing part 3 is set onto base plate 2. Intermediate housing part 3 has a plug connection 4 at one side. Consequently, intermediate housing part 3 could also be designated as plug housing. Plug connection 4 includes electrical connections for current supply and for receiving and emitting electrical data signals and control signals. Intermediate housing part 3 is fastened to base plate 2 via five riveting locations, in the particular specific embodiment shown. As may be seen in FIG. 3, the five riveting locations protrude as studs 12 and engage with complementary fastening parts 13 of intermediate housing part 3.

Control circuit 5 is situated on a ceramic circuit carrier on base plate 2. The ceramic circuit carrier is adhered onto base plate 2 for heat dissipation. Next to it is situated a position sensor 6. Position sensor 6 operates according to an inductive measuring method with two coils as stator and one coil on a rotor 11. One of the two coils on the stator is a transmitting coil and the second coil is a receiving coil on the stator. The coil on rotor 11 increases or decreases the inductance measured by the receiving coil as a function of the position of rotor 11.

According to the example embodiment of the present invention, the stator of contact-free, rotatory position sensor 6 is enclosed by crosspieces 7, 8. The stator includes both the at least two coils for the inductive position measurement and a sensor printed-circuit board 9 having an evaluation electronic system situated on it. The evaluation electronic system measures the inductively generated current, which cooperates with the further inductive coil on rotor 11 shown in FIGS. 2 and 3. The evaluation circuit passes on the evaluated data on specified positions of a gear lever operable by the driver, correspondingly via electrical, so-called bond connections 10 made of thick aluminum wire, to control circuit 5. Bond connections 45 connect electrical contacts of the control circuit to contacts of plug connection 4.

With that, position sensor 6 is able to determine statically the position of rotor 11. The electrical contacts for bond connections 10 on printed-circuit board 9 are located at an end region 97, this means at a circumferential edge of sensor printed-circuit board 9, which is closest to control circuit 5. In this area of the connections, crosspieces 7, that enclose sensor printed-circuit board 9, are interrupted, in order to implement as short as possible a connection path.

Sensor printed-circuit board 9 has an eye through which there passes a selector lever shaft 30, which is connected by form-locking to rotor 11. Selector lever shaft 30 is mechanically or electromechanically connected to the gear lever in the passenger compartment. An edge region 98, i.e. the circumferential edge or rim, of the circular eye of sensor printed-circuit board 9 is enclosed by an annular crosspiece 8 that is formed by intermediate housing part 3. Because the stator which surrounds sensor printed-circuit board 9, is molded in together with an injection molding process for producing intermediate housing part 3, the stator is located, at a very high tolerance quality, at a predefined position with respect to rotor 11. The reproducibility of the relative position of the stator with respect to rotor 11, and consequently the system tolerance is clearly improved over the usual adhesion connections of a sensor printed-circuit board 9 in a housing, that are to be produced having an x, y, z offset. The quality of position sensor 6 is thus improved and the adjustability during installation of control device 1 is made easier.

Figure 2:
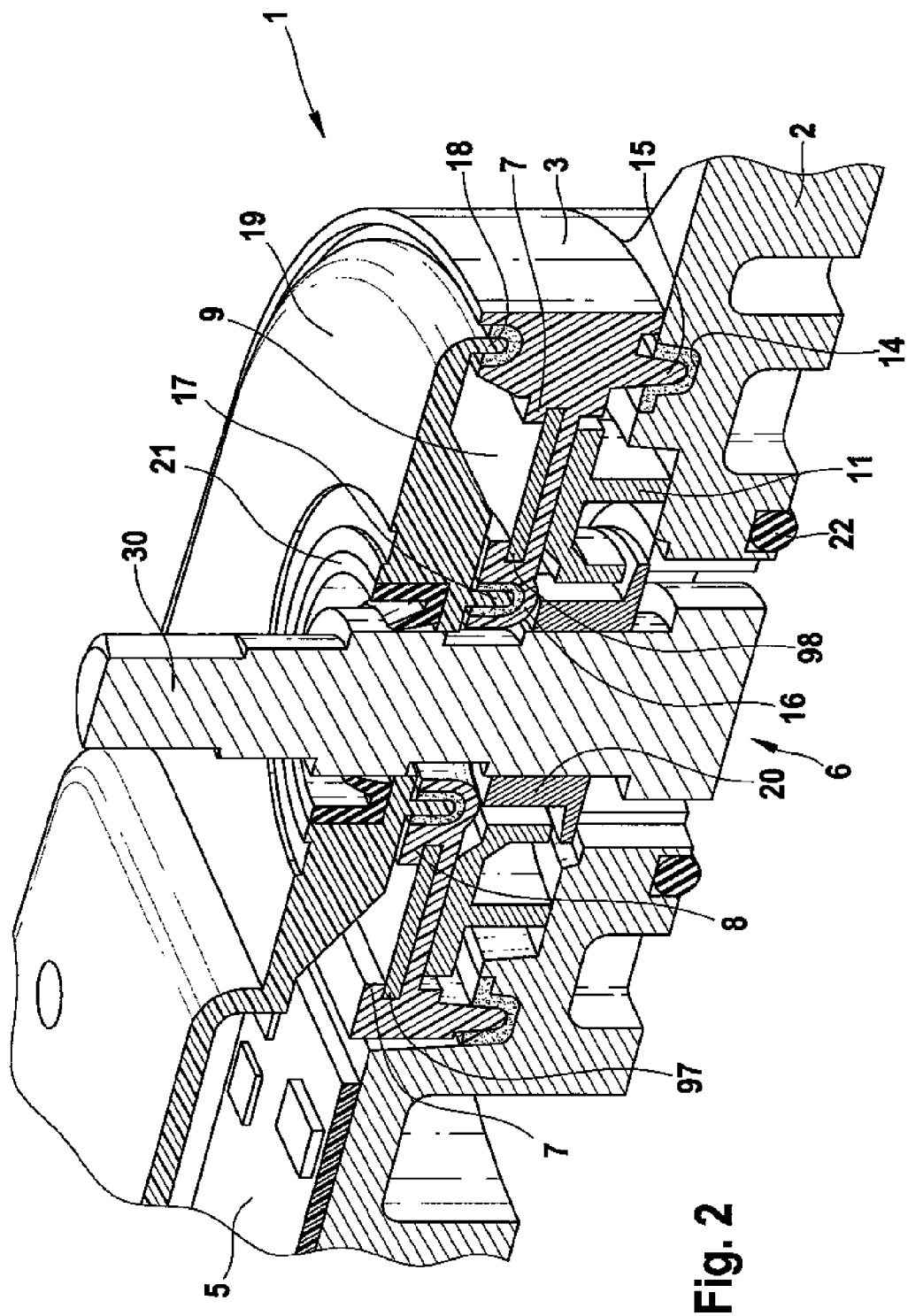
FIG. 2 shows a cross sectional view in perspective form of the control device.

Control device 1 is shown in FIG. 2 in a perspective view. Base plate 2 is mounted on a transmission that is not shown, as a so-called add-on control device, directly onto the transmission in the engine compartment. Control device 1 thus has to be resistant to conditions such as temperature stress, temperature change stress, accelerations and media in the engine compartment.

Intermediate housing part 3 is sealed by a groove 14, in base plate 2, having a protruding tenon 15, using an adhesive for secure coverage from outer influences. Cover 19 is sealed in the same way from intermediate housing part 3, using tongue-and-groove adhesions 16, 17, 18 shown in FIG. 2. During assembly, selector lever shaft 30 is plugged from below into base plate 2 through a bore in the latter. Onto selector lever shaft 30 a rotor adaptor 20 is mounted which, in turn, is connected by form-locking to rotor 11. Rotor 11 has a coil, not shown, which collaborates inductively with two coils (not shown) on sensor printed-circuit board 9. A radial shaft seal 21 is inserted in cover 19, for the purpose of sealing protruding selector lever shaft 30. A mechanical selector lever, not shown, that is in operative connection to the gear lever, is mounted on selector lever shaft 30.

According to the present invention, the stator of position sensor 6, which includes the two coils, that are not shown, on sensor printed-circuit board 9, is injection molded directly into intermediate housing part 3. Intermediate housing part 3 forms sidewalls for the housing of control device 1. Base plate 2 forms a housing floor, and cover 19 forms an upper closure. The stator, together with sensor printed-circuit board 9, is surrounded by intermediate housing part 3 with housing material. Only edge regions 97, 98, that is, the edges of sensor printed-circuit board 9, are enclosed by crosspieces 7, 8 at the inner and outer circumferential edge. Consequently, on sensor printed-circuit board 9, semiconductor electronic components are able to protrude during molding without impairment. Thus, the assembly tolerances of the stator, which have a direct influence on the position tolerances of position sensor 6, are advantageously reduced to a very tight range, compared to the usual fastening method, using an adhesive. The number of assembly steps is reduced, since the adhesion method of sensor printed-circuit board 9 into the housing is omitted in assembling control device 1.

For a good dissipation of the heat loss created during operation of the switches, control circuit 5 is adhered directly onto base plate 2.

An O-ring seal 22, which is fitted into a groove on the bottom of base plate 2, seals the space around selector lever shaft 30 from the transmission, from below.

Figure 3:
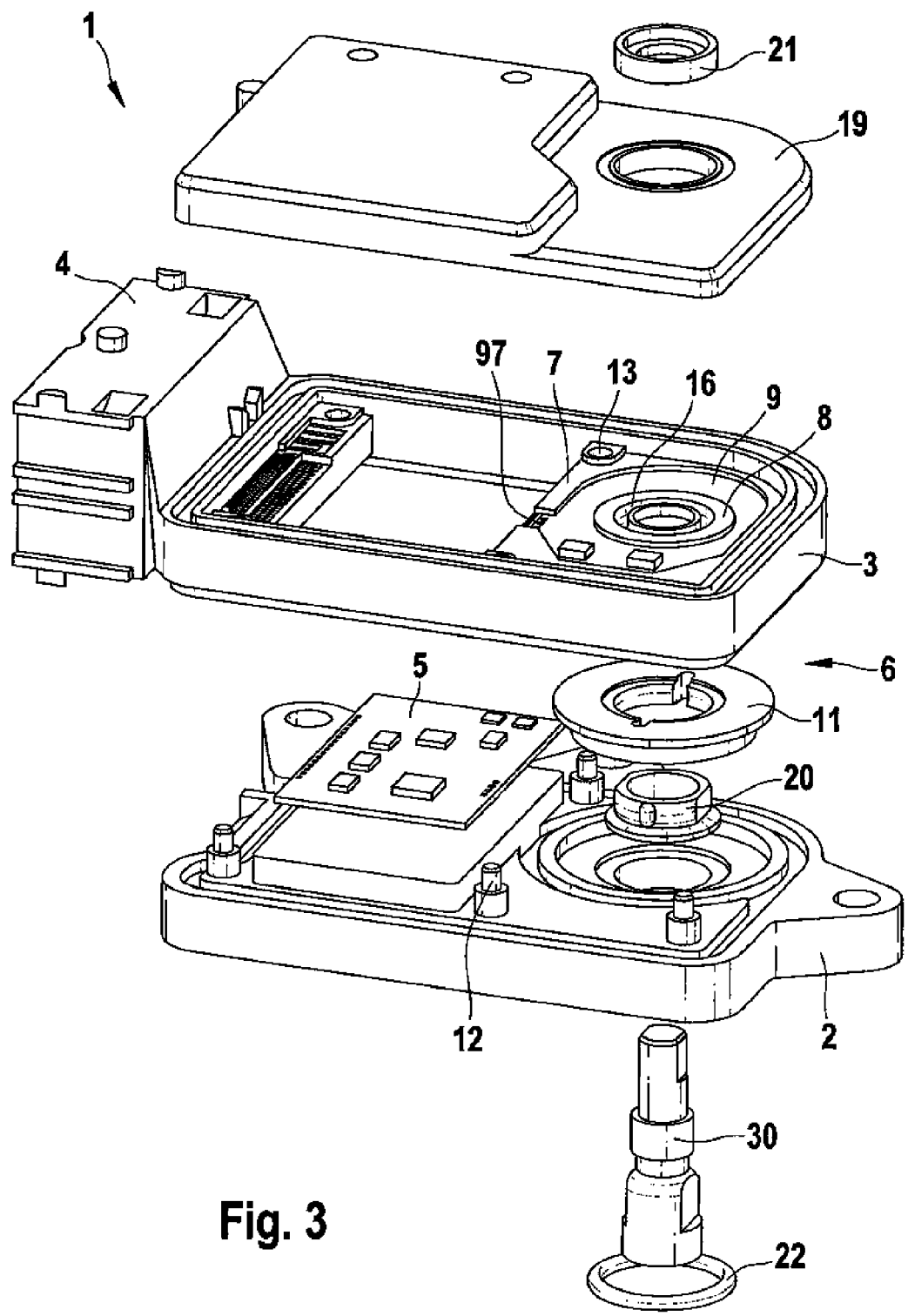
FIG. 3 shows an exploded representation of the control device.

FIG. 3 shows an exploded representation of the advantageous production method of a control device 1, according to the present invention. In this production method, the assembly is clearly simplified, since sensor printed-circuit board 9, which forms the stator of position sensor 6, has already been molded into intermediate housing part 3, having accurate positioning, using tight assembly tolerances. The adhesion process, in which printed-circuit board 9 is adhered into intermediate housing part 3, is no longer necessary. In the exploded representation, FIG. 3 shows that control circuit 5 is able to be directly adhered onto the pedestal on base plate 2. It also becomes apparent how rotor adaptor 20 and rotor 11 are able to be strung onto selector lever shaft 30 in a form-locking manner. Cover 19, having radial sealing ring 21, seals control device 1 from above.

All the figures show, only schematically, illustrations that are not to scale.

What is claimed is:

1. An electronic control device for controlling an automatic transmission, comprising:
 a housing formed of a material; and
 a control circuit, an integrated plug connector and an integrated position sensor in the housing, the position sensor including a stator and a rotor;
 wherein the stator of the position sensor is enclosed in a stationary manner by the material of the housing;
 wherein the stator includes a sensor printed-circuit board, whose edge regions are enclosed by crosspieces of the housing in a stationary manner.

2. The control device as recited in claim 1, wherein the stator includes two coils which cooperate with a coil on the rotor according to an inductive method.

3. The control device as recited in claim 1, wherein the crosspieces are clip crosspieces.

4. The control device as recited in claim 1, wherein the sensor printed-circuit board of the position sensor is molded into the housing.

5. The control device as recited in claim 1, wherein the housing includes a base plate, an intermediate housing part and a cover.

6. The control device as recited in claim 5, wherein the sensor printed-circuit board is molded into the intermediate housing part.

7. The control device as recited in claim 5, wherein the intermediate housing part and the cover are made of plastic, and the base plate is made of aluminum.

8. The control device as recited in claim 1, wherein the crosspieces that enclose the edge regions of the sensor printed-circuit board are interrupted in a vicinity of electrical adhesive connections.

9. A method for manufacturing a control device, comprising:
 producing the control device, the control device for controlling an automatic transmission and including a control circuit, an integrated plug connector and an integrated position sensor in a housing, the position sensor including a stator and a rotor, wherein the stator of the position sensor is molded into the housing.

* * * * *